United States Patent
Sun et al.

(10) Patent No.: US 12,535,514 B2
(45) Date of Patent: Jan. 27, 2026

(54) MOBILITY ATTENUATION TESTING EQUIPMENT FOR 5G HIGH BAND

(71) Applicant: Telefonaktiebolaget LM Ericsson (publ), Stockholm (SE)

(72) Inventors: Haitao Sun, Kirkland (CA); Shuo Lu, Pointe-Claire (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 18/247,664

(22) PCT Filed: Oct. 14, 2020

(86) PCT No.: PCT/IB2020/059659
§ 371 (c)(1),
(2) Date: Apr. 3, 2023

(87) PCT Pub. No.: WO2022/079473
PCT Pub. Date: Apr. 21, 2022

(65) Prior Publication Data
US 2024/0019474 A1    Jan. 18, 2024

(51) Int. Cl.
*G01R 29/10*    (2006.01)
*H04W 24/06*    (2009.01)

(52) U.S. Cl.
CPC ......... *G01R 29/105* (2013.01); *H04W 24/06* (2013.01)

(58) Field of Classification Search
CPC ..... G01R 29/105; H04W 24/06; H04W 24/00
See application file for complete search history.

(56) References Cited

U.S. PATENT DOCUMENTS 8,295,777 B1    10/2012    Yenney et al.

FOREIGN PATENT DOCUMENTS

| EP | 3035729 A1 * | 6/2016 | ........... H04B 17/318 |
| WO | 2012/171562 A1 | 12/2012 | |

OTHER PUBLICATIONS

International Search Report and Written Opinion dated Jun. 28, 2021 issued in PCT Application No. PCT/IB2020/059659 filed Oct. 14, 2020, consisting of 14 pages.

(Continued)

*Primary Examiner* — Zhitong Chen
(74) *Attorney, Agent, or Firm* — Sonoda & Kobayashi Intellectual Property Law; Darren M. Gardner (57) ABSTRACT

A test chamber and method for testing mobility performance of a wireless device (WD) are disclosed. The test chamber includes a housing to house the WD during the mobility performance test. The housing has a first opening configured to enable wireless communication between the WD and a first base station, and a second opening configured to enable wireless communication between the WD and a second base station. A first RF reactive material is configured to at least partially shield energy from entry or exit through the first opening and a second RF reactive material is configured to at least partially shield energy from entry or exit through the second opening. A drive system is configured to move the first RF reactive material over the first opening and move the second RF reactive material over the second opening.

22 Claims, 6 Drawing Sheets

(56) References Cited

OTHER PUBLICATIONS

Vargas et al., Measurements of Construction Materials Penetration Losses at Frequencies from 26.5 GHz to 40 GHz; 2017 IEEE Xplore, consisting of 4 pages.

Vargas et al., Measurements of Reflection and Penetration Loss of Construction Materials at 28 GHz and 38 GHz; 2018 IEEE Xplore, consisting of 4 pages.

* cited by examiner

MOBILITY ATTENUATION TESTING EQUIPMENT FOR 5G HIGH BAND

CROSS-REFERENCE TO RELATED APPLICATION

This application is a Submission Under 35 U.S.C. § 371 for U.S. National Stage Patent Application of International Application Number: PCT/IB2020/059659, filed Oct. 14, 2020 entitled "MOBILITY ATTENUATION TESTING EQUIPMENT FOR 5G HIGH BAND," the entirety of which is incorporated herein by reference.

TECHNICAL FIELD

Wireless communication and in particular, to mobility attenuation testing equipment for Fifth Generation (5G) high band communications.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between base stations, such as base stations, and mobile wireless devices (WD), as well as communication between base stations and between WDs.

Low Band (600-900 MHz) 5G uses a similar frequency range as some LTE bands (such as Band 5 and Band 6), which gives download speeds that are slightly higher than LTE (30-250 megabits per second (mbps)). Low Band 5G cell towers are contemplated to have a similar range and coverage area as current LTE towers. Some countries are not implementing Low Band 5G due to minimal service levels. Mid Band 5G uses microwaves having frequencies of 2.5-3.7 GHz, currently allowing downlink speeds of 100-900 mbps, and providing a range of several miles. This level of service is the most widely deployed and should be available in most metropolitan areas in the year 2020.

High Band 5G currently uses frequencies of 25-39 GHz, which is near the lower end of the millimeter wave band. Even higher frequencies may be used in the future. High Band 5G may achieve download speeds of a gigabit per second (gbps), which is comparable to cable-connected Internet. However, millimeter waves (mmWave or mmW) only have a limited range (200-500 meters). Thus, high density small cell deployment is required to provide good coverage. Millimeter waves also have trouble passing through some types of materials, such as walls and windows. Due to the higher costs, most operators plan to deploy High Band 5G cells only in dense urban environments, and areas where crowds of people congregate, such as sports stadiums and convention centers. The gigibit per second download speeds have been achieved in actual tests, and are expected to increase.

5G testing plays an important role in 5G device and equipment development, certification and quality control. Such testing is important to device vendors, 5G equipment manufacturers, university and research institutes. Both conducted (radio frequency (RF) over cable) and OTA (RF over the air) modes of communication can be tested. A well-controlled RF environment is desirable to achieve best results, find root causes, and mimic various real situations.

For Low Band 5G and Mid Band 5G testing, an RF attenuation box may be placed between 5G baseband antenna RF units and antenna ports of WDs. Controlling the attenuation of the RF attenuation box can trigger various RF conditions, such as performing handover. For 5G High Band, due to the small coverage of the cell, WDs may perform more handovers during the communication. To avoid the reduction of service quality, a WD must quickly find the next cell. Therefore, handover testing of WDs is considered useful.

SUMMARY

Some embodiments advantageously provide a method and system for mobility attenuation testing equipment for Fifth Generation (5G) high band communications. In some embodiments, 5G handover testing is enabled in a lab environment. More particularly, a test chamber that is easy to manufacture and use is provided in some embodiments. The test chamber may be partially absorber-lined. The test chamber has at least one opening that is at least partially coverable with absorbing material. The absorbing material absorbs RF electromagnetic energy that travels over the air (OTA) through the opening. In the 5G high band, frequencies of 26 GHz or higher is out of range of conventional RF attenuation boxes. Also, massive multiple input multiple output (MIMO) and beamforming are very hard to perform in a conducted way. Accordingly, some embodiments herein provide an inexpensive OTA method for testing mobility performance of wireless devices (WDs).

According to one aspect, a test chamber is configured to test a mobility performance of a wireless device, WD. The test chamber includes a housing configured to house the WD during the mobility performance test. The housing includes a first opening configured to enable wireless communication between the WD and a first base station; and a second opening configured to enable wireless communication between the WD and a second base station, the first and second base stations being exterior to the housing. The test chamber includes a first shield configured to at least partially shield energy from entry or exit through the first opening and a second shield configured to at least partially shield energy from entry or exit through the second opening. The test chamber includes a drive system configured to move the first shield over the first opening and move the second shield over the second opening.

According to this aspect, in some embodiments, the drive system is configured to drive the first shield independently of driving the second shield. In some embodiments, at least one of the first shield and the second shield includes electromagnetic energy absorbing material. In some embodiments, at least one of the first shield and the second shield includes electromagnetic energy reflecting material. In some embodiments, the drive system is configured to move at least one of the first shield and the second shield across a respective opening to reduce energy into and out of the housing to simulate a handover condition. In some embodiments, the drive system is configured to move the first shield to increase shielding of the first opening while simultaneously moving the second shield to decrease shielding of the second opening. In some embodiments, the drive system is configured to entirely cover at least one of the first and second openings. In some embodiments, the drive system is configured to move at least one of the first and second shields to trigger a handoff event. In some embodiments, the housing is further configured to provide an additional two openings to enable additional communication with additional base stations that are exterior to the housing. In some embodiments, the drive system is configured to move the first shield and the second shield to cause a first drop in power through the first opening and to cause a second drop in power through the second opening. In some embodiments, interior walls of the test chamber are lined with one of radio frequency (RF) absorbing material and RF reflecting material.

According to another aspect, a method for testing mobility performance of a wireless device, WD is provided. The method includes positioning the WD within a housing, the housing having two openings at different sides of the housing. The method also includes establishing a wireless communication link between the WD and a first base station through one of the two openings and at least partially shielding at least one of the two openings. The method further includes increasing the shielding of at least one of the two openings until power through the at least one of the two openings drops below a first level sufficient to trigger a handoff event.

According to this aspect, in some embodiments, the shielding of at least one of the two openings of the housing includes shielding of one of the two openings by a first amount and a shielding of the other one of the two openings of the housing by a second amount different from the first amount. In some embodiments, the method further includes comparing an amount of power received by the WD that triggers the handoff event to a predetermined value. In some embodiments, the method also includes decreasing the shielding after increasing the shielding, the decreasing being performed until power through the at least one of the two openings of the housing rises above a second level sufficient to cancel a handoff. In some embodiments, the method also includes simultaneously increasing shielding of one of the two openings of the housing and decreasing shielding of the other one of the two openings of the housing. In some embodiments, the method also includes comparing signal strength of a signal between the WD and a first base station through the first opening of the housing to signal strength of a signal between the WD and a second base station through the second opening of the housing, the first and second base stations being outside the housing. In some embodiments, the method further includes increasing shielding of a first opening of the housing until a first handoff from the first base station to the second base station begins. In some embodiments, the method also includes decreasing the shielding of a second opening of the housing until the handoff to the second base station occurs. In some embodiments, increasing the shielding of the first opening of the housing occurs independently of decreasing the shielding of the second opening of the housing. In some embodiments, the shielding is performed by at least partially covering the at least one of the two openings of the housing with a material that partially absorbs electromagnetic energy. In some embodiments, interior walls of the housing are lined with one of radio frequency (RF) absorbing material and RF reflecting material.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail example embodiments, it is noted that the embodiments reside primarily in combinations of apparatus components and processing steps related to mobility attenuation testing equipment for Fifth Generation (5G) high band communications. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
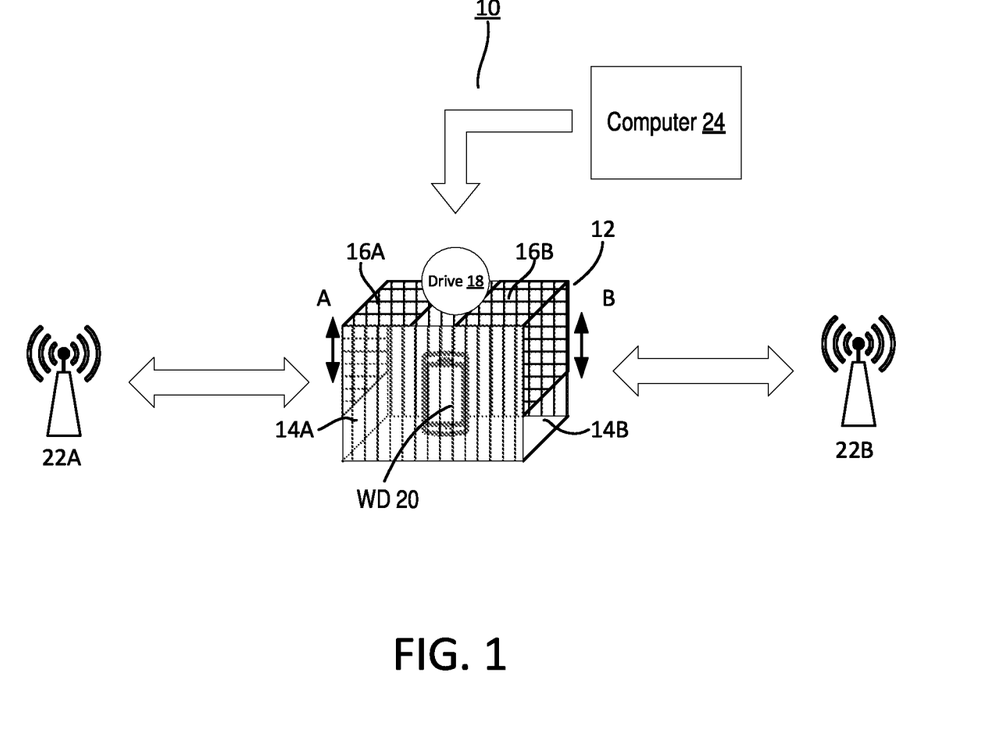
FIG. 1 illustrates a test configuration according to principles disclosed herein.

Referring now to the drawing figures where like reference designators refer to like elements, FIG. 1 shows a test system 10 that includes a housing 12, e.g., shield box, that may be partially lined with RF absorber and having sides A and B that may be at least partially opened to expose an interior of the housing 12 to an exterior of the housing 12. Thus, in the example of FIG. 1, openings 14A and 14B are on sides A and B of the housing 12. Although the housing 12 is shown being rectangular in shape, other shapes may be implemented. For example, the housing 12 may be irregular in shape. Also, although two openings 14A and 14B in the housing 12 are shown in FIG. 1, one opening or more than two openings may be implemented. Also, although the openings in the housing 12 are shown in FIG. 1 on opposite sides of the housing 12, opening could be on adjacent or other non-opposite sides of the housing 12. Also, the openings in the housing 12 can be of different sizes and shapes.

RF reactive materials 16A and 16B may be positioned by a drive system 18 to cover at least a portion of the openings 14A and 14B on the sides A and B of the housing 12, respectively. When there are more than two openings, additional RF reactive material may be driven by the drive system 18 to cover additional openings. Note that FIG. 1 shows the RF reactive materials 16A and 16B hanging over the open as a curtain. In other embodiments, the RF reactive materials 16A and/or 16B may be rigid and moved from side to side, for example, to cover their respective openings 14A and 14B. In some embodiments, the reactive materials may roll up and down from a roll and/or slide in tracks like a garage door.

In operation, a WD 20 is placed in the interior of the housing 12. Exterior to the housing on side A is a first base station 22A and on side B is a second base station 22B. In one test, both base stations 22A and 22B are in radio communication with the WD 20. The power received by the WD from the base station 22A, or by the base station 22A from the interior of the housing 12, will depend on the amount of coverage of the opening 14A by the RF reactive materials 16A, which in turn, is controlled by the drive system 18. Similarly, the power received by the WD from the base station 22B, or by the base station 22B from the interior of the housing 12, will depend on the amount of coverage of the opening 14B by the RF reactive materials 16B. Note that there may be a base station corresponding to each of a plurality of openings more than two.

Note that the term "RF reactive material" as used herein in reference to material 16A and/or 16B may actually partially or wholly absorb RF electromagnetic energy, and/or may partially or wholly reflect RF electromagnetic energy. The RF reactive material 16A, 16B is also referred to herein as a shield because it is employed to at least partially shield RF electromagnetic energy from exit or entry through the respective opening 14A, 14B. Examples of RF reactive material are known by persons of ordinary skill in the art, and include: wood, glass, concrete, styrofoam, or a carbon-infused, rigid absorber using the same absorbing material as used to line the housing 12. The choice of material to be used for the materials 16A and 16B, which may be the same or different materials, may depend on a level of reference signal received power (RSRP) to be received, or desired to be received. The penetration losses of some example materials are given in Table 1.

TABLE 1

| Material | Thickness (cm) | 28 Ghz Penetration Loss (dB) | 38 GHz Penetration Loss (dB) |
|---|---|---|---|
| Thin Polystyrene | 1.2 | 0.004 | 0.009 |
| Thick Polystyrene | 4.9 | 0.005 | 0.01 |
| Thin Pressed Wood | 0.35 | 1.52 | 2.57 |
| Thick Pressed Wood | 1.6 | 5.97 | 7.68 |
| Thin Wood | 0.8 | 3.57 | 4.74 |
| Wooden Door | 3.5 | 16.33 | 17.52 |
| Glass Window | 1 | 1.38 | 3.72 |
| Brick Wall | 28 | 58.48 | 63.81 |

A purpose of the RF reactive material is to control an amount of power that propagates through the openings 14A and 14B. This control is achieved in the embodiment of FIG. 1 by the drive system 18. For example, the RF reactive material 16A, 16B, may be rolled and unrolled from a roll of material under the control of the drive system 18. In some embodiments, each roll of RF reactive material 16A, 16B may hang as a curtain over the respective openings 14A, 14B, and each curtain may be together or separately raised or lowered by the drive system 18. In some embodiments, each curtain is not unrolled by a roll of absorber-infused, fabric material, but rather is a rigid material such as thick or thin wood, or styrofoam, for example, that is raised and lowered under the control of the drive system 18.

In some embodiments, the drive system 18 includes a motor and a linkage assembly that links the two RF reactive materials 16A and 16B, so that raising one curtain of material 16A is synchronous with the lowering of the other curtain of RF reactive material 16B, and vice versa. In some embodiments, both curtains of RF reactive material 16A, 16B can be raised or lowered at the same time, or at different times.

In operation, when one half of side A is covered by the RF reactive material 16A, the RSRP detected by the WD 20 will be reduced by 3 dB, which means the received energy is reduced by half. When three fourths of side A is covered by the RF reactive material 16A, there is an additional 3 dB of loss. Thus, by controlling the coverage of each opening 14A, 14B by the RF reactive materials 16A, 16B, respectively, the power received by the WD 20 from each base station 22A, 22B can be controlled, and handover conditions can be simulated. Handover conditions include, for example, a condition where the WD 20 is in primary communication with the base station 22A and the power from the first base station 22A drops below a first threshold when the power from the base station 22B is above a second threshold greater than the first threshold.

Figure 2:
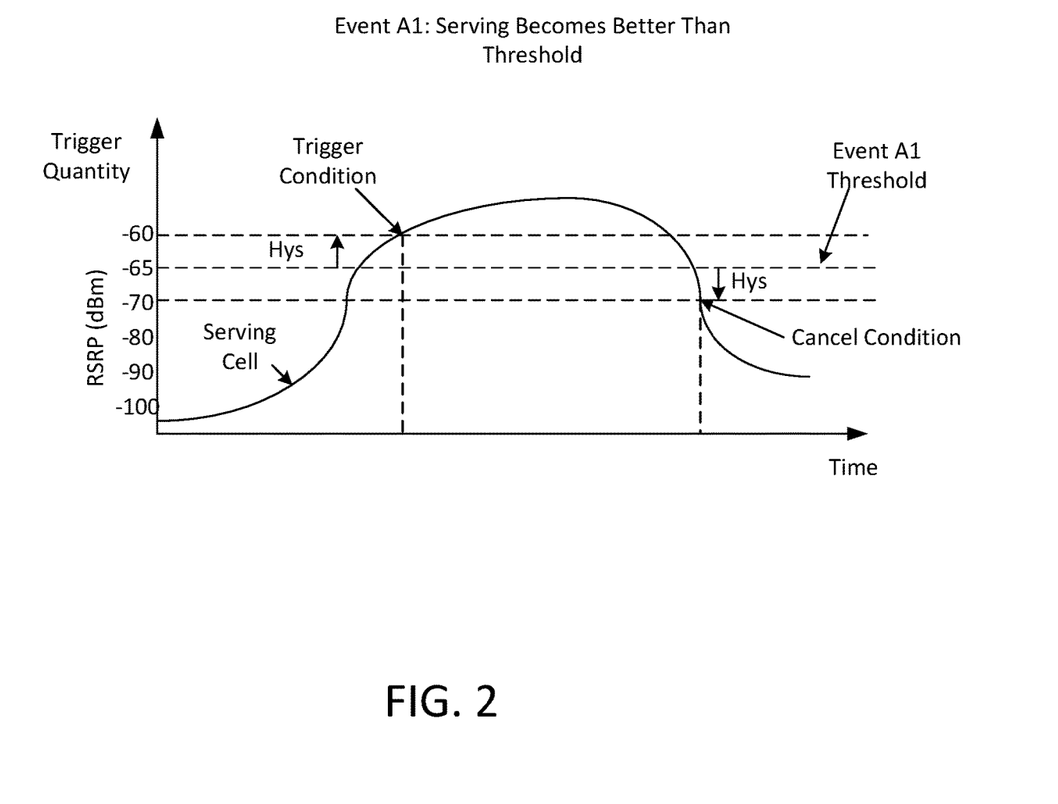
FIG. 2 illustrates handover conditions for an event A1.
Figure 3:
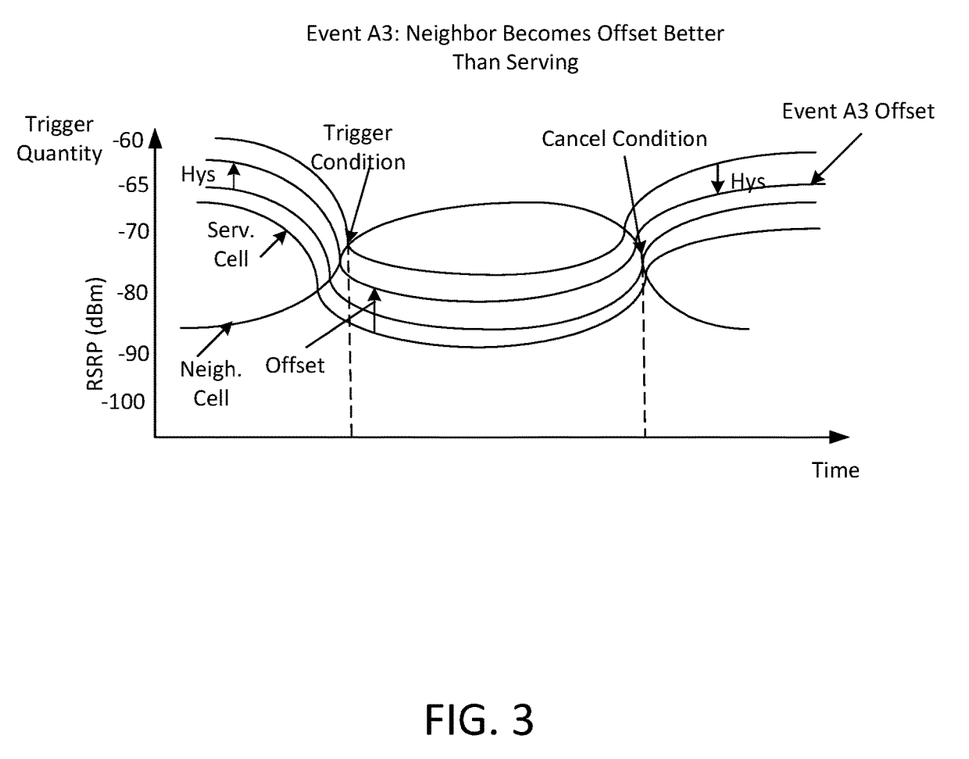
FIG. 3 illustrates handover conditions for an event A3.
Figure 4:
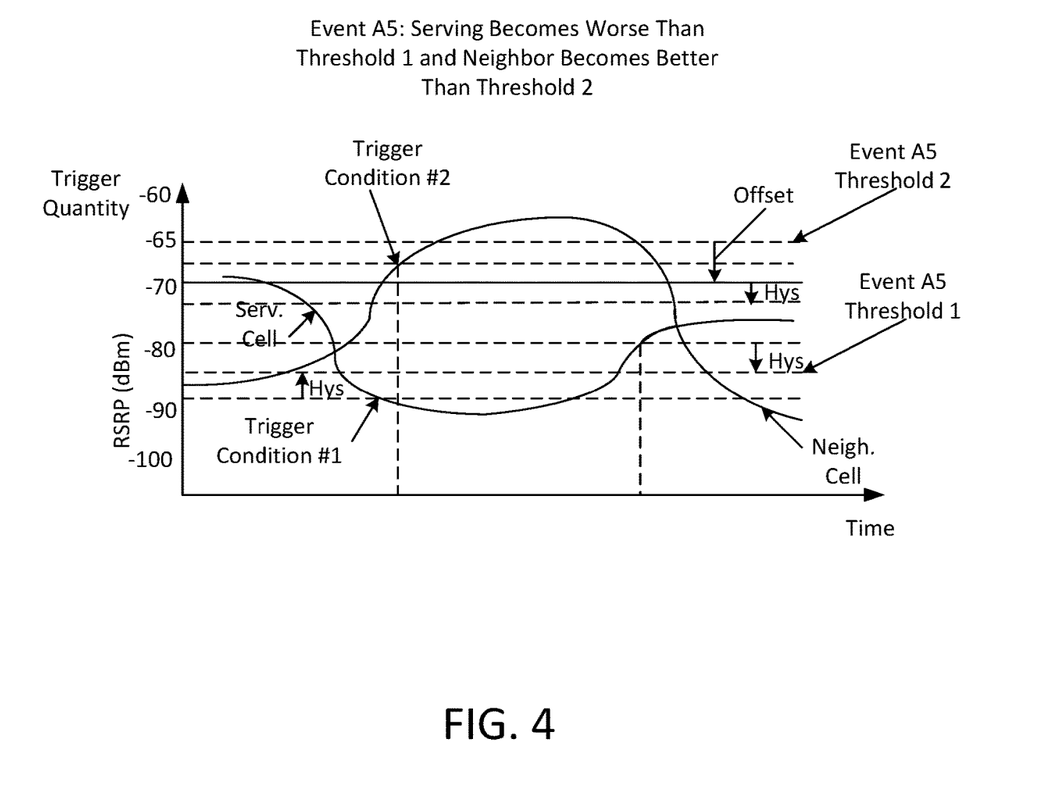
FIG. 4 illustrates handover conditions for an event A5.

Three example different handover conditions that can be simulated by the test system 10 are shown in FIGS. 2-4. Other handover conditions may be tested as well. The handover conditions may be implemented via a computer 24 that may be configured to generate signals to the drive system 18 to cause a desired sequence of handover events, as described below and as illustrated by FIGS. 2-4. Further details of the computer 24 are described below with reference to FIG. 5.

FIG. 2 shows a handover condition, event A1. In event A1, a trigger condition occurs when the serving cell (for example, base station 22A) RSRP exceeds a threshold plus a hysteresis value and a cancel condition occurs when the serving cell RSRP falls below the threshold minus the hysteresis value. FIG. 3 shows a handover condition, event A3. In this case, a trigger condition occurs when the RSRP of the neighbor cell (for example, base station 22B) rises above the RSRP of the serving cell (for example, base station 22A) plus an offset. A cancel condition occurs when the RSRP of the neighbor cell falls below the RSRP of the serving cell plus an offset. FIG. 4 shows a handover condition, event A5. In this case, the serving cell becomes worse than a first threshold followed by the neighbor cell becoming better than a second threshold.

As one example, suppose the NR high band output is −20 dBm with opening 14A fully uncovered and opening 14B fully covered. The WD 20 will then receive full signal strength from the base station 22A and the signal strength received by the WD 20 from the base station 22B will be fully attenuated. If RF reactive material 16A is then adjusted to cover half of the opening 14A and RF reactive material 16B is adjusted to cover three fourths of the opening 14B, the RSRP received by the WD 20 from the base station 22A should be −40 dBm and the RSRP received by the WD 20 from the base station 22B should be −80 dBm. Conversely, when RF reactive material 16B is then adjusted to cover half of the opening 14B and RF reactive material 16A is adjusted to cover three fourths of the opening 14A, the RSRP received by the WD 20 from the base station 22B should be −40 dBm and the RSRP received by the WD 20 from the base station 22A should be −80 dBm. In some embodiments, the RSRPs received from the respective base stations 22A and 22B may be raised and lowered to simulate the rise or fall of the RSRPs shown in FIGS. 2-4 to test the handover capabilities of the WD 20. Note that in some embodiments, to vary the power levels received by the WD 20 from the respective base stations 22A and 22B, a combination of different materials may be employed in sequence, together with variation of the amount of covering of the respective openings 14A and 14B.

In some embodiments, the various electronic equipment, including the WD 20 and the base stations 22A and 22B, may be controlled remotely via a computer, as is known in the art. Such computer may operate according to computer program instructions that cause the drive system 18 to move the RF reactive materials as desired, for example, to achieve the RSRP conditions over time that are depicted in FIGS. 2-4. In this way, the handover behavior of the WD 20 can be characterized by the test system 10.

Figure 5:
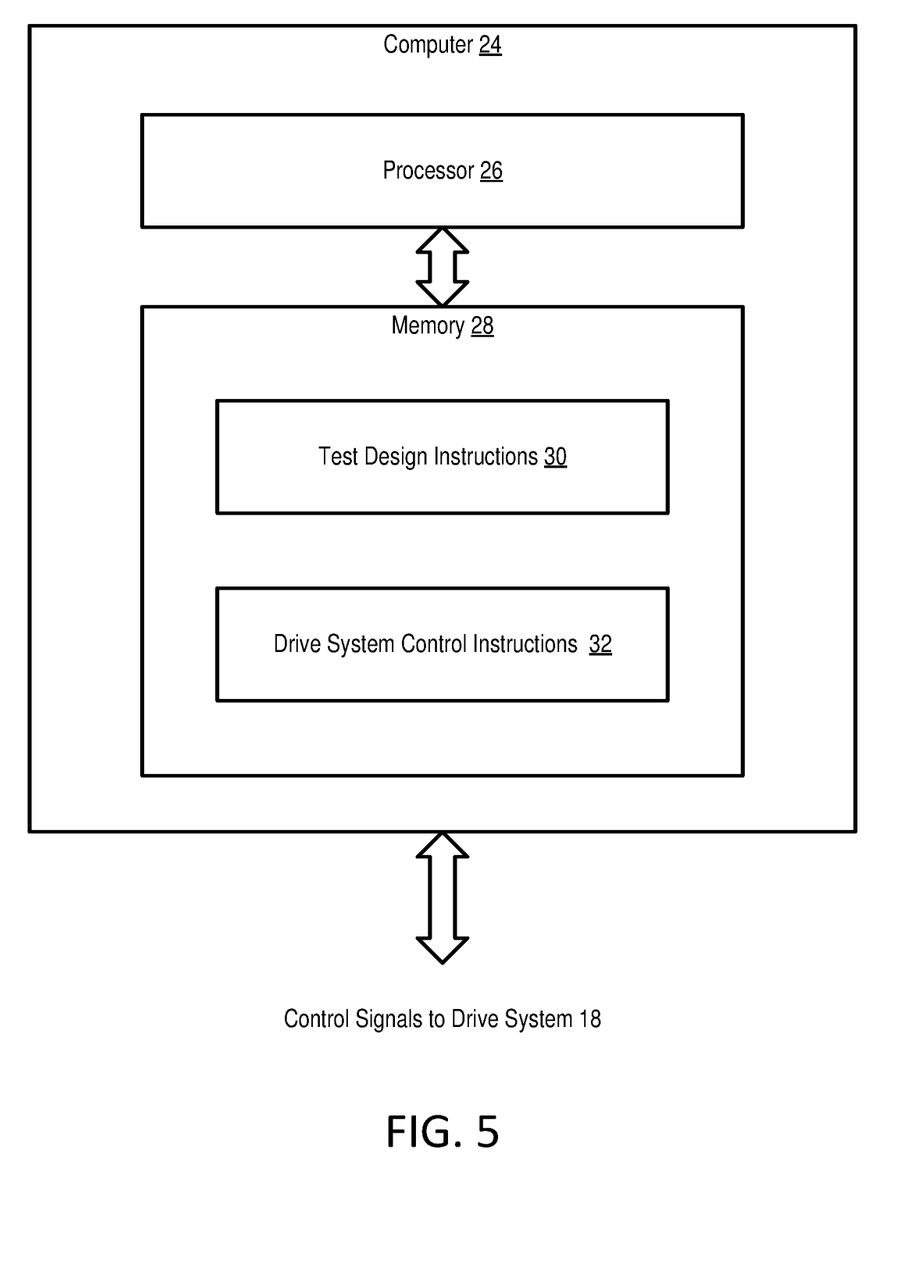
FIG. 5 is a block diagram of a computer for mobility performance testing.

FIG. 5 is a block diagram of an example computer 24 configured to perform the tests of wireless mobility performance discussed above. The computer 24 includes a processor 26 and a memory 28. The computer instructions stored in memory 28 may include test design instructions 30 and drive system control instructions 32. In some embodiments, the processor 26 and the memory 28 may form processing circuitry. In particular, in addition to or instead of a processor, such as a central processing unit, and memory, the processing circuitry may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the computer 24 further has software instructions 30 and 32 stored internally in, for example, memory 28, or stored in external memory (e.g., database, storage array, network storage device, etc.) accessible by the computer 24 via an external connection. The instructions 30, 32 may be executable by the processing circuitry. The processing circuitry may be configured to control any of the methods and/or processes described herein and/or to cause such methods, and/or processes to be performed, e.g., by computer 24. Processor 26 corresponds to one or more processors 26 for performing computer 24 functions described herein. The memory 28 is configured to store data, programmatic software code and/or other information described herein. In some embodiments, the instructions 30, 32 may include instructions that, when executed by the processor 26 and/or processing circuitry, causes the processor 26 and/or processing circuitry to perform the processes described herein with respect to computer 24. Although not shown, the computer 24 includes communication interfaces and circuits to enable the computer 24 to communicate with other devices, including providing control signals to drive system 18. The computer 24 may also include other peripherals such as input/output devices, displays, etc.

The test design instructions 30 may include instructions to enable the user to select a set of design parameters for configuring a test to be performed using the test system 10. Such design parameters may include a choice of events such as events A1, A3 and A5, discussed above. Once design parameters are chosen, a sequence of drive system control instructions is configured or selected to drive the RF reactive materials 16A and 16B to achieve the desired test conditions, as specified using a graphical user interface that interacts with the computer 24 and its user.

The drive system control instructions 32 may include instructions to translate a particular test selected by the user to a set of signals to control the drive system 18 to drive the RF reactive materials 16A and 16B to achieve the desired test conditions, which may include, for example, driving the RF reactive materials 16A and 16B to achieve a particular sequence of RSRPs detected by the WD 20.

Figure 6:
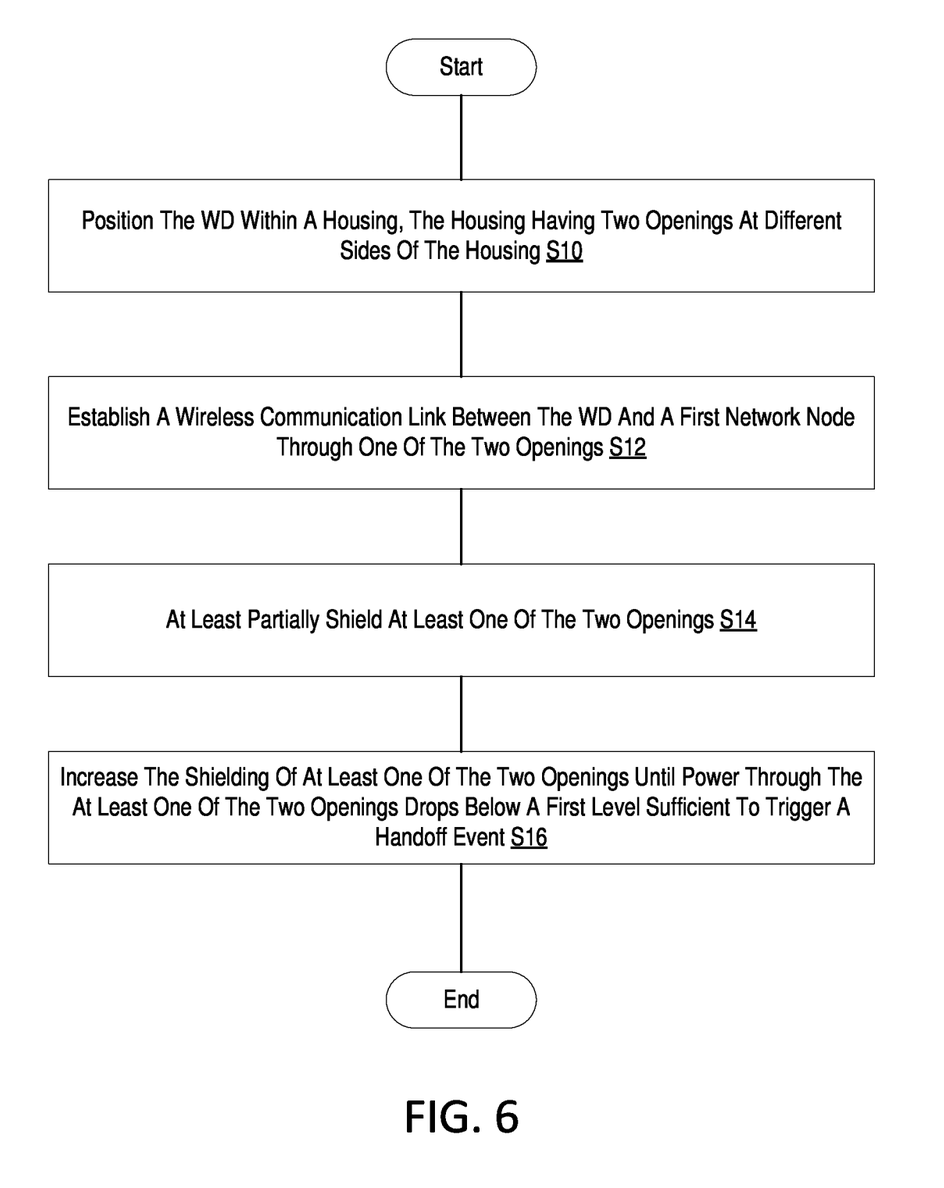
FIG. 6 is a flowchart of an example process for mobility performance testing.

FIG. 6 is a flowchart of an example process for performing a test of wireless mobility performance of a WD 20. The process may be performed by the processor 26 operating in conjunction with the other components of the test system 10. The process includes positioning the WD within a housing, the housing having two openings at different sides of the housing (Block S10). The process also includes establishing, under control of the computer 24, a wireless communication link between the WD and a first base station through one of the two openings (Block S12). The process further includes at least partially shielding, under control of the drive system 18, which in turn is under control of the computer 24, at least one of the two openings (Block S14). The process also includes increasing the shielding of at least one of the two openings until power through the at least one of the two openings drops below a first level sufficient to trigger a handoff event (Block S16).

According to one aspect, a test chamber is configured to test a mobility performance of a wireless device, WD 20. The test chamber includes a housing 12 configured to house the WD 20 during the mobility performance test. The housing 12 includes a first opening 14A configured to enable wireless communication between the WD 20 and a first base station 22A; and a second opening 14B configured to enable wireless communication between the WD 20 and a second base station 22B, the first and second base stations 22B being exterior to the housing 12. The test chamber includes a first RF reactive material 16A configured to at least partially shield energy from entry or exit through the first opening 14A and a second RF reactive material 16B configured to at least partially shield energy from entry or exit through the second opening 14B. The test chamber includes a drive system 18 configured to move the first RF reactive material 16A over the first opening 14A and move the second RF reactive material 16B over the second opening 14B.

According to this aspect, in some embodiments, the drive system 18 is configured to drive the first RF reactive material 16A independently of driving the second RF reactive material 16B. In some embodiments, at least one of the first RF reactive material 16A and the second RF reactive material 16B includes electromagnetic energy absorbing material. In some embodiments, at least one of the first RF reactive material 16A and the second RF reactive material 16B includes electromagnetic energy reflecting material. In some embodiments, the drive system 18 is configured to move at least one of the first RF reactive material 16A and the second RF reactive material 16B across a respective opening to reduce energy into and out of the housing 12 to simulate a handover condition. In some embodiments, the drive system 18 is configured to move the first RF reactive material 16A to increase shielding of the first opening 14A while simultaneously moving the second RF reactive material 16B to decrease shielding of the second opening 14B. In some embodiments, the drive system 18 is configured to entirely cover at least one of the first and second openings. In some embodiments, the drive system 18 is configured to move at least one of the first and second shields to trigger a handoff event. In some embodiments, the housing 12 is further configured to provide an additional two openings to enable additional communication with additional base stations that are exterior to the housing 12. In some embodiments, the drive system 18 is configured to move the first RF reactive material 16A and the second RF reactive material 16B to cause a first drop in power through the first opening 14A and to cause a second drop in power through the second opening 14B. In some embodiments, interior walls of the test chamber are lined with one of radio frequency (RF) absorbing material and RF reflecting material.

According to another aspect, a method for testing mobility performance of a wireless device, WD 20 is provided. The method includes positioning the WD 20 within a housing 12, the housing 12 having two openings at different sides of the housing 12. The method also includes establishing a wireless communication link between the WD 20 and a first base station 22A through one of the two openings and at least partially shielding at least one of the two openings. The method further includes increasing the shielding of at least one of the two openings until power through the at least one of the two openings drops below a first level sufficient to trigger a handoff event.

According to this aspect, in some embodiments, the shielding of at least one of the two openings of the housing 12 includes shielding of one of the two openings by a first amount and a shielding of the other one of the two openings of the housing 12 by a second amount different from the first amount. In some embodiments, the method further includes comparing an amount of power received by the WD 20 that triggers the handoff event to a predetermined value. In some embodiments, the method also includes decreasing the shielding after increasing the shielding, the decreasing being performed until power through the at least one of the two openings of the housing 12 rises above a second level sufficient to cancel a handoff. In some embodiments, the method also includes simultaneously increasing shielding of one of the two openings of the housing 12 and decreasing shielding of the other one of the two openings of the housing 12. In some embodiments, the method also includes comparing signal strength of a signal between the WD 20 and a first base station 22A through the first opening 14A of the housing 12 to signal strength of a signal between the WD 20 and a second base station 22B through the second opening 14B of the housing 12, the first and second base stations being outside the housing 12. In some embodiments, the method further includes increasing shielding of a first opening 14A of the housing 12 until a first handoff from the first base station 22A to the second base station 22B begins. In some embodiments, the method also includes decreasing the shielding of a second opening 14B of the housing 12 until the handoff to the second base station 22B occurs. In some embodiments, increasing the shielding of the first opening 14A of the housing 12 occurs independently of decreasing the shielding of the second opening 14B of the housing 12. In some embodiments, the shielding is performed by at least partially covering the at least one of the two openings of the housing 12 with a material that partially absorbs electromagnetic energy. In some embodiments, interior walls of the housing 12 are lined with one of radio frequency (RF) absorbing material and RF reflecting material.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A test chamber configured to test a mobility performance of a wireless device, WD, the test chamber comprising:
 a housing configured to house the WD during the mobility performance test, the housing comprising:
  a first opening configured to enable wireless communication between the WD and a first base station; and
  a second opening configured to enable wireless communication between the WD and a second base station, the first and second base stations being exterior to the housing;
 a first RF reactive material configured to at least partially shield energy from entry or exit through the first opening and a second RF reactive material configured to at least partially shield energy from entry or exit through the second opening; and
 a drive system configured to:
  move the first RF reactive material over the first opening;
  move the second RF reactive material over the second opening; and
  alter shielding of the first opening independently of altering the shielding of any other opening.

2. The test chamber of claim 1, wherein the drive system is configured to drive the first RF reactive material independently of driving the second RF reactive material.

3. The test chamber of claim 1, wherein at least one of the first RF reactive material and the second RF reactive material includes electromagnetic energy absorbing material.

4. The test chamber of claim 1, wherein at least one of the first RF reactive material and the second RF reactive material includes electromagnetic energy reflecting material.

5. The test chamber of claim 1, wherein the drive system is configured to move at least one of the first RF reactive material and the second RF reactive material across a respective opening to reduce energy into and out of the housing to simulate a handover condition.

6. The test chamber of claim 1, wherein the drive system is configured to move the first RF reactive material to increase shielding of the first opening while simultaneously moving the second RF reactive material to decrease shielding of the second opening.

7. The test chamber of claim 1, wherein the drive system is configured to entirely cover at least one of the first and second openings.

8. The test chamber of claim 1, wherein the drive system is configured to move at least one of the first and second shields to trigger a handoff event.

9. The test chamber of claim 1, wherein the housing is further configured to provide an additional two openings to enable additional communication with additional base stations that are exterior to the housing.

10. The test chamber of claim 1, wherein the drive system is configured to move the first RF reactive material and the second RF reactive material to cause a first drop in power through the first opening and to cause a second drop in power through the second opening.

11. The test chamber of claim 1, wherein interior walls of the test chamber are lined with one of radio frequency (RF) absorbing material and RF reflecting material.

12. A method for testing mobility performance of a wireless device, WD, the method comprising:
 positioning the WD within a housing, the housing having two openings at different sides of the housing;
 establishing a wireless communication link between the WD and a first base station through one of the two openings;
 at least partially shielding at least one of the two openings; and
 independently increasing the shielding of at least one of the two openings until power through the at least one of the two openings drops below a first level sufficient to trigger a handoff event.

13. The method of claim 12, wherein the shielding of at least one of the two openings of the housing includes shielding of one of the two openings by a first amount and a shielding of the other one of the two openings of the housing by a second amount different from the first amount.

14. The method of claim 12, further comprising comparing an amount of power received by the WD that triggers the handoff event to a predetermined value.

15. The method of claim 12, further comprising decreasing the shielding after increasing the shielding, the decreasing being performed until power through the at least one of the two openings of the housing rises above a second level sufficient to cancel a handoff.

16. The method of claim 12, further comprising simultaneously increasing shielding of one of the two openings of the housing and decreasing shielding of the other one of the two openings of the housing.

17. The method of claim 12, further comprising comparing signal strength of a signal between the WD and a first base station through the first opening of the housing to signal strength of a signal between the WD and a second base station through the second opening of the housing, the first and second base stations being outside the housing.

18. The method of claim 17, further comprising increasing shielding of a first opening of the housing until a first handoff from the first base station to the second base station begins.

19. The method of claim 17, further comprising decreasing the shielding of a second opening of the housing until the handoff to the second base station occurs.

20. The method of claim 19, wherein increasing the shielding of the first opening of the housing occurs independently of decreasing the shielding of the second opening of the housing.

21. The method of claim 12, wherein the shielding is performed by at least partially covering the at least one of the two openings of the housing with a material that partially absorbs electromagnetic energy.

22. The method of claim 12, wherein interior walls of the housing are lined with one of radio frequency (RF) absorbing material and RF reflecting material.

* * * * *